United States Patent
Yim et al.

(10) Patent No.: US 6,950,282 B2
(45) Date of Patent: Sep. 27, 2005

(54) DEVICE FOR REDUCING DAMAGE DUE TO HEAD SLAP WITHIN A HARD DISK DRIVE

(75) Inventors: Pyongwon Yim, Sunnyvale, CA (US); Hae Sung Kwon, Sunnyvale, CA (US); Tho Pham, Milpitas, CA (US); Hyung J. Lee, Cupertino, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/167,861

(22) Filed: Oct. 7, 1998

(65) Prior Publication Data

US 2003/0189790 A1 Oct. 9, 2003

(51) Int. Cl.[7] .................................................. G11B 5/48
(52) U.S. Cl. .................................................. 360/245.5
(58) Field of Search ........................... 360/245.5, 245.2, 360/106, 102, 103, 48, 245.7, 245.1, 245.3, 245.4, 245.6, 265.9, 266, 266.1, 244.8, 244.9, 245; 29/603.04; 369/15, 16, 17, 18

(56) References Cited

U.S. PATENT DOCUMENTS

| | | | | |
|---|---|---|---|---|
| 4,280,156 A | * | 7/1981 | Villette | 360/105 |
| 5,262,911 A | * | 11/1993 | Cain et al. | 360/104 |
| 5,333,085 A | * | 7/1994 | Prentice et al. | 360/245.7 |
| 5,446,611 A | * | 8/1995 | Webber | 360/245 |
| 5,519,552 A | * | 5/1996 | Kohira et al. | 360/244.3 |
| 5,590,095 A | * | 12/1996 | Chaya | 369/13 |
| 5,612,841 A | * | 3/1997 | Johnson | 360/245.2 |
| 5,663,853 A | * | 9/1997 | Park | 360/103 |
| 6,011,671 A | * | 1/2000 | Masse et al. | 360/245.4 |
| 6,181,525 B1 | * | 1/2001 | Carlson | 360/245.7 |
| 6,191,915 B1 | * | 2/2001 | Takagi et al. | 360/245.7 |
| 6,226,153 B1 | * | 5/2001 | Toyuyama et al. | 360/245.7 |
| 6,266,212 B1 | * | 7/2001 | Coon | 360/234.5 |

FOREIGN PATENT DOCUMENTS

| | | | |
|---|---|---|---|
| JP | 1-245479 | * | 9/1989 |
| JP | 6-12635 | * | 1/1994 |

\* cited by examiner

*Primary Examiner*—Tianjie Chen
(74) *Attorney, Agent, or Firm*—Ben J. Yorks; Jeffrey P. Aiello; Irell & Manella LLP

(57) ABSTRACT

A hard disk drive assembly that includes a device for limiting a movement of a head of a head gimbal assembly from a surface of a disk. The head is coupled to the disk and attached to a suspension of the head gimbal assembly. The invented device limits a distance that the head can move away from a surface of the disk. Limiting the distance that the head can move away from the surface of the disk, may reduce the impact force associated with the head slapping the disk, which may reduce damage associated with head slapping.

7 Claims, 2 Drawing Sheets

DEVICE FOR REDUCING DAMAGE DUE TO HEAD SLAP WITHIN A HARD DISK DRIVE

BACKGROUND OF THE INVENTION

1. Field of the Invention

The present invention relates to a device which limits a movement of a head within a hard disk drive assembly.

2. Background Information

Hard disk drives contain transducers that are magnetically coupled to one or more rotating disks. The transducers can write and read information by magnetizing the disk surface and sensing the magnetic field that flows from the disks, respectively. The transducers are integrated into a head that is mounted to a suspension. The head and suspension are typically referred to as a head gimbal assembly (HGA).

The HGA's of a hard disk drive are mounted to an actuator arm that is pivotally connected to a base plate of the drive. The drive may further include a voice coil motor that rotates the actuator arm and moves the heads across the surfaces of the disks.

Each head has an air bearing surface which cooperates with an air flow generated by the rotation of the disks to create an air bearing pressure between the transducers and the disk surfaces, while the disks are rotating. The air bearing pressure allows the head to fly over a rotating disk at a certain nominal fly height to prevent mechanical wear between the disks and the heads.

The heads are essentially suspended from the actuator arm above or below the surfaces of disks. Any shock or vibration loads essentially perpendicular to the disk surfaces may cause the heads to strike or "slap" the disks. Head slapping may damage both the heads and the disks.

Head slapping typically occurs when the shock load is great enough to cause the head to "separate" away from the disk surface. The largest head slapping forces are typically associated with the top and bottom HGAs located adjacent to the base plate and the cover plate of the disk drive, since there is a relatively large amount of space between the plates and the top and bottom HGAs. The large spaces allow the heads to move away from the disk surfaces and then slap back onto the disks.

The force required to create a head slap can be increased by reducing the length of the suspension and/or reducing the mass of the head. Reducing the length of the arm and/or the mass may create an undesirable change in the mechanical characteristic of the HGA. It would be desirable to provide a hard disk drive that limits the movement of an HGA within the drive.

SUMMARY OF THE INVENTION

The present invention comprises a hard disk drive assembly that includes a device for limiting a movement of a head of a head gimbal assembly from a surface of a disk. The head is coupled to the disk and attached to a suspension of the head gimbal assembly. The invented device limits a distance that the head can move away from a surface of the disk. By limiting the distance that the head can move away from the surface of the disk, the impact force associated with the head slapping the disk may be reduced. This may reduce damage to the head, the disk, or both.

DETAILED DESCRIPTION

The applicants disclose a hard disk drive assembly that includes a device for limiting a movement of a head of a head gimbal assembly from a surface of a disk. The head is coupled to the disk and attached to a suspension of the head gimbal assembly. The device of the present invention limits a distance that the head can move away from a surface of the disk. By limiting the distance that the head can move away from the surface of the disk, the impact force associated with the head slapping the disk may be reduced, to reduce damage associated with head slapping.

One embodiment of the present invention is an extended distal end of an actuator arm beam. The extended distal end of the actuator arm beam extends above a portion of the suspension to limit the distance that the head can move away from the surface of the disk. In another embodiment, the present invention is a limiter plate that limits a movement of the head from the surface of the disk. By limiting the distance that the head can move away from the surface of the disk, the impact force associated with the head slapping the disk may be reduced. This may reduce damage to the head, the disk, or both.

Figure 1:
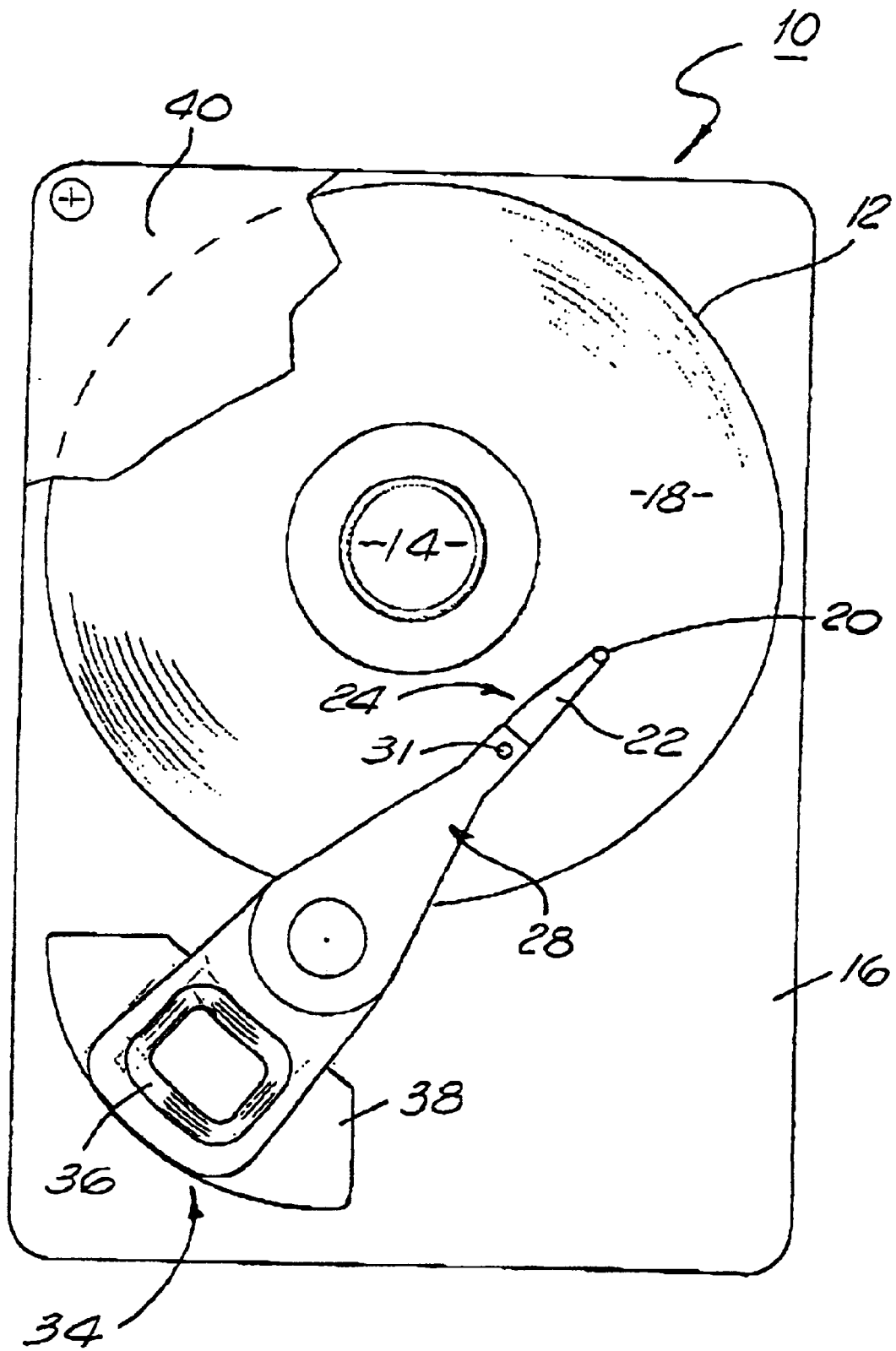
FIG. 1 is a top view of a hard disk drive assembly of the present invention.
Figure 2:
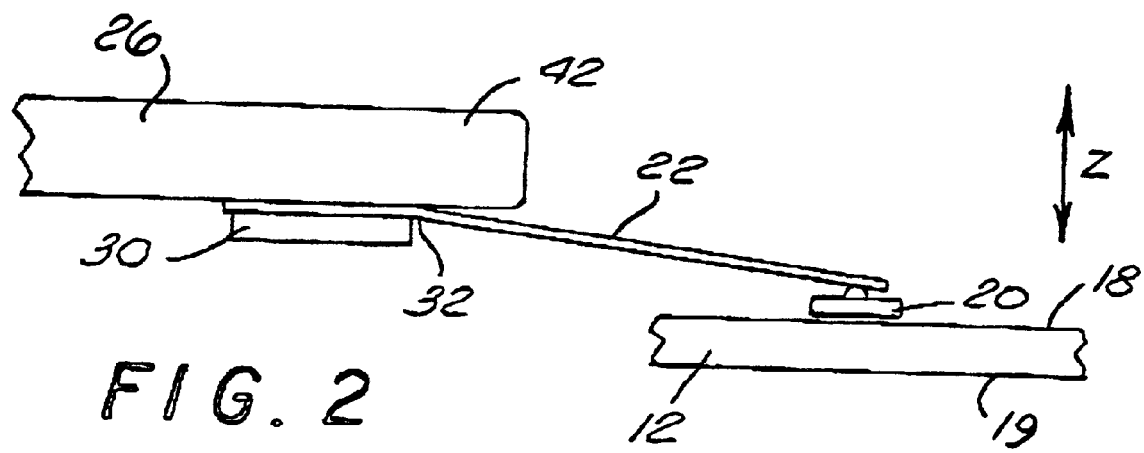
FIG. 2 is a side sectional view of the disk drive assembly.

Referring to the drawings more particularly by reference numbers, FIGS. 1 and 2 show an embodiment of a hard disk drive assembly 10 of the present invention. The disk drive assembly 10 may include one or more disks 12 that are rotated by a spin motor 14. The spin motor 14 may be mounted to a base plate 16. Each disk 12 may have a top surface 18 and an opposite bottom surface 19.

A plurality of heads 20 may be magnetically coupled to the disks 12. The heads 20 may each contain one or more transducers that are electrically connected to electronic circuitry (both not shown) of the disk drive. The circuitry and transducers can write and read information by magnetizing and sensing the magnetic field of the disks 12, respectively.

Each head 20 is mounted to a suspension 22. The head 20 and suspension 22 are commonly referred to as a head gimbal assembly (HGA) 24. Typically there is an HGA 24 associated with each surface 18 and 19 of a disk 12. The HGAs 24 are mounted to beams 26 of an actuator arm 28 that is pivotally mounted to the base plate 16.

The suspensions 22 are typically attached to the actuator arm beams 26 with swage plates 30. The swage plates 30 extend through corresponding apertures 31 in the beams 26 and the suspensions 22. Each suspension 22 may have an elbow 32 so that the arm 22 is inclined toward the surface 18 of a corresponding disk 12.

The actuator arm 28 may be coupled to a voice coil motor 34 that can be actuated to rotate the arm 28 and move the heads 20 across the surfaces 18 and 19 of the disks 12. The voice coil motor 34 comprises a voice coil 36 that is coupled to the actuator arm 28, and a magnet assembly 38 that is coupled to the voice coil 36 and attached to the base plate 16. The disks 12, HGAs 24, actuator arm 28 and voice coil motor 34 are enclosed by a cover 40 that is attached to the base plate 16.

It is desirable to prevent movement of the heads 20 along a "z direction", for example, in a direction that is generally perpendicular to the surfaces 18,19 of the disks 12, as indicated by the arrow shown in FIG. 2. This movement may be induced by external shock or vibration loads. Z movement of the heads 20 away from the disk surfaces may result in a counter movement back into the disks 12. The impact force of the heads 20 striking the disk surfaces 18 and 19 may cause damage to the heads 20, the disks 12, or both.

Figure 3:
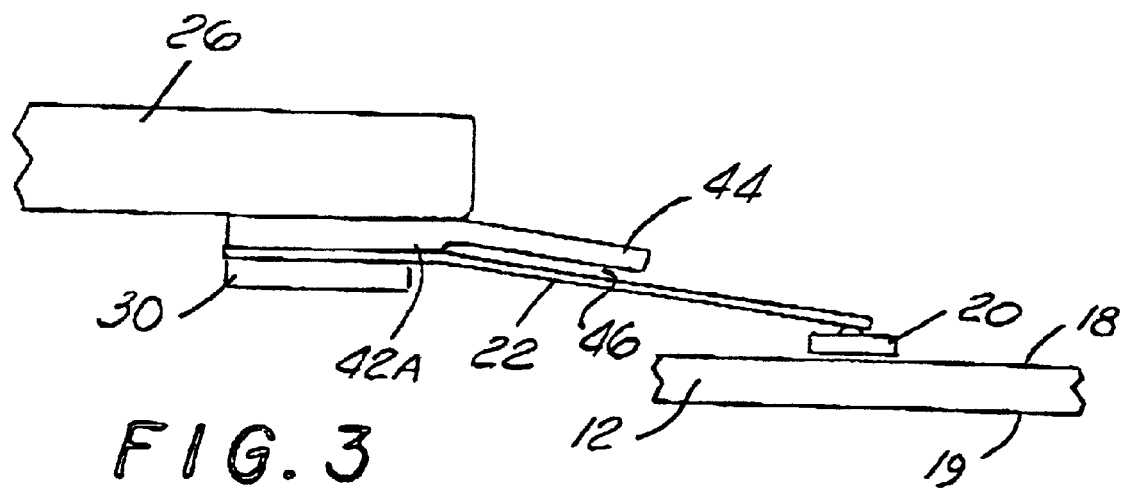
FIG. 3 is a side sectional view showing an alternate embodiment of the invented disk drive assembly.

Each actuator arm beam 26 may have an arm extension 42 that extends beyond the elbow 32 of the suspension 22. The arm extension 42 limits the movement of the head 20 away from the disk surface. By limiting the generally perpendicular movement Z of the suspension 22 and head 20 away from the disk surface, the arm extension 42 limits the momentum and corresponding impact force of the head 20 as it slaps the disk 12. FIG. 3 shows another embodiment of the present invention wherein the disk drive assembly includes a limiter plate 42A that is attached to the suspension 22 and the actuator arm beam 26. The limiter plate 42A includes an outwardly projecting tab 44 that extends along the suspension 22. Preferably, the tab 44 may be inclined toward the suspension 22 to minimize a gap 46 between the tab 44 and arm 22. The gap 46 should be sufficiently wide to account for manufacturing tolerances and insure that the tab 44 does not inadvertently exert pressure against the suspension 22 during the operation of the drive. The gap 46 should also be sufficiently narrow to prevent undesirable movement of the head 20 away from the disk surface 18, 18 adjacent to the head 20.

Figure 4:
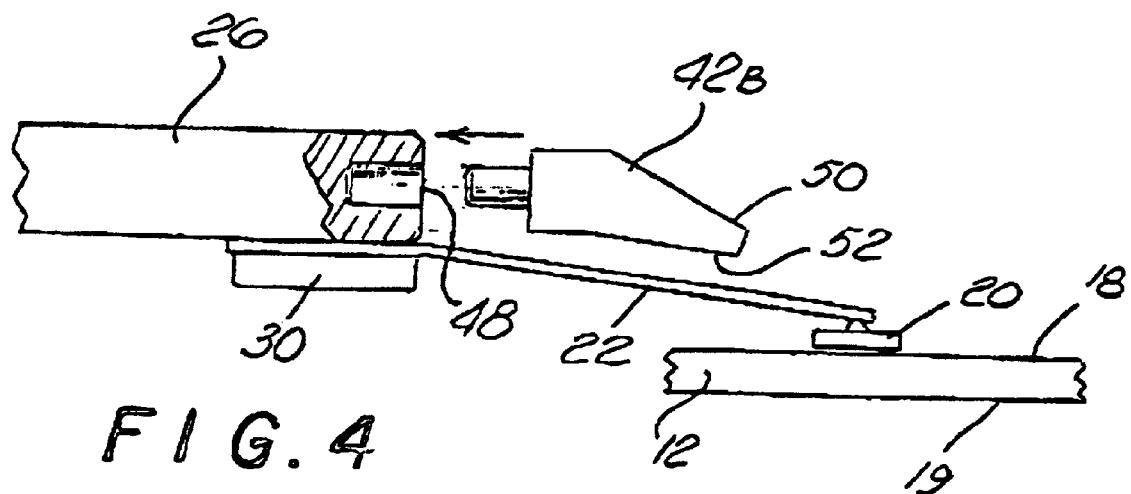
FIG. 4 is a side sectional view showing another alternate embodiment of the disk drive assembly.

FIG. 4 shows an alternative embodiment of the limiter plate 42B that is attached to an end surface 48 of the actuator arm beam 26. The alternative embodiment of the limiter plate 42B has a lower height profile than the first embodiment 42A, shown in FIG. 3. The alternative embodiment of the limiter plate 42B may have a tapered end section 50. Preferably, the end section 50 has a slanted bottom surface 52 that extends generally parallel to the suspension 22, when the limiter plate 42B is attached to the end surface 48.

When the drive is subjected to a shock load, such as a shock load generally perpendicular to the disks 12 along the Z direction, the corresponding forces can cause both the suspension 22 and limiter plate 42A or 42B to move away from the disks 12 or toward the disks. The stiffness of the limiter plate 42A or 42B may be greater than the stiffness of the suspension 22 so that the plate 42A or 42B does not deflect in an upward or downward direction as much as the arm 22 would move without a limiter. The smaller plate deflection will therefore limit the movement of the arm 22 away from the disk. The limiter plate 42A or 42B may also have a mechanical transfer function that insures that the plate does not move in phase with the suspension 22 during shock or vibrational loading.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A hard disk drive assembly, comprising:

a baseplate;

a disk that has a surface;

a spin motor that rotates said disk;

a head that is coupled to said disk surface to read and write information with said disk;

a suspension having a first end and a second end, said second end being attached to said head, said suspension having a pre-bent elbow portion located adjacent to said first end;

an actuator arm which has a beam that is directly attached to said first end of said suspension, said beam having a proximal end and a distal end that extends beyond said elbow of said suspension and is separated from said suspension when said head reads and writes information with said disk, said distal end limits a movement of said head when said suspension moves and engages said actuator arm, said actuator beam having a swage plate opening at said distal end of said beam;

a voice coil that is attached to said proximal end of said actuator arm; and, a magnet attached to said base plate.

2. The hard disk drive assembly of claim 1, wherein said movement is essentially perpendicular to said surface.

3. The hard disk drive assembly of claim 1, wherein said head is separated from said distal end a distance measured along a direction parallel to said surface.

4. The hard disk drive assembly of claim 1, further comprising a swage plate, said swage plate to attach said beam to said first end of the suspension.

5. The hard disk drive assembly of claim 1, wherein said elbow causes said suspension to incline in the direction of said surface.

6. The hard disk drive assembly of claim 1, wherein said suspension separates said head from said distal end along a first direction and along a second direction, said first direction to be measured essentially parallel to said surface, said second direction to be measured essentially perpendicular to said surface.

7. The hard disk drive assembly of claim 1, wherein said distal end is to limit an impact force of said head on said surface by limiting said movement.

\* \* \* \* \*